US011109192B2

(12) United States Patent
Miller et al.

(10) Patent No.: US 11,109,192 B2
(45) Date of Patent: Aug. 31, 2021

(54) USER-SPECIFIC MOTION MODEL FOR LOCATION ESTIMATION

(71) Applicant: Apple Inc., Cupertino, CA (US)

(72) Inventors: Isaac T. Miller, Half Moon Bay, CA (US); Benjamin A. Werner, San Jose, CA (US); Changlin Ma, San Jose, CA (US); Christina Selle, Los Altos, CA (US); Saurabh Godha, Santa Clara, CA (US); Mark G. Petovello, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 179 days.

(21) Appl. No.: 16/417,478

(22) Filed: May 20, 2019

(65) Prior Publication Data
US 2020/0084583 A1    Mar. 12, 2020

Related U.S. Application Data

(60) Provisional application No. 62/730,502, filed on Sep. 12, 2018.

(51) Int. Cl.
*H04W 4/029*   (2018.01)

(52) U.S. Cl.
CPC .................................. *H04W 4/029* (2018.02)

(58) Field of Classification Search
CPC ........ H04W 4/029; H04W 4/027; H04W 4/80
See application file for complete search history.

(56) References Cited

U.S. PATENT DOCUMENTS

| 7,747,409 | B2 | 6/2010 | Ladetto et al. |
| 8,694,251 | B2 | 4/2014 | Janardhanan |
| 9,442,564 | B1 * | 9/2016 | Dillon ..................... G06F 3/017 |
| 10,820,137 | B1 * | 10/2020 | Newstadt .............. H04W 4/026 |
| 2008/0055155 | A1 * | 3/2008 | Hensley ................ G01S 5/0027 342/357.31 |
| 2016/0123738 | A1 | 5/2016 | Bellusci |
| 2016/0216118 | A1 | 7/2016 | Kazemipur et al. |
| 2017/0059602 | A1 | 3/2017 | Miller |
| 2018/0180443 | A1 * | 6/2018 | Han ...................... H04W 4/029 |

FOREIGN PATENT DOCUMENTS

WO    WO 2017/060660        4/2014

* cited by examiner

*Primary Examiner* — Brandon J Miller
(74) *Attorney, Agent, or Firm* — Morgan, Lewis & Bockius LLP

(57) ABSTRACT

A device implementing a system for estimating device location includes at least one processor configured to estimate a first position of a device based on a first set of parameters, the first set of parameters derived from first sensor data obtained on the device, the first set of parameters corresponding to device motion. The at least one processor is configured to estimate a second position of a user of the device based on a second set of parameters, the second set of parameters derived from second sensor data obtained on the device, the second set of parameters corresponding to user motion. Estimating the first and second positions is constrained by a predefined relationship between the device motion and the user motion. The at least one processor is configured to provide at least one of the first position of the device or the second position of the user.

20 Claims, 5 Drawing Sheets

USER-SPECIFIC MOTION MODEL FOR LOCATION ESTIMATION

CROSS-REFERENCE TO RELATED APPLICATIONS

The present application claims the benefit of U.S. Provisional Patent Application Ser. No. 62/730,502, entitled "USER-SPECIFIC MOTION MODEL FOR LOCATION ESTIMATION," filed Sep. 12, 2018, which is hereby incorporated herein by reference in its entirety and made part of the present U.S. Utility Patent Application for all purposes.

TECHNICAL FIELD

The present description relates generally to user location estimation, including using device sensors to estimate user-specific motion and location.

BACKGROUND

An electronic device such as a laptop, tablet, smartphone or a wearable device may include a Global Navigation Satellite System (GNSS) receiver and one or more sensors (e.g., an accelerometer, a gyroscope) which can be used in conjunction with each other to estimate the location of the electronic device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
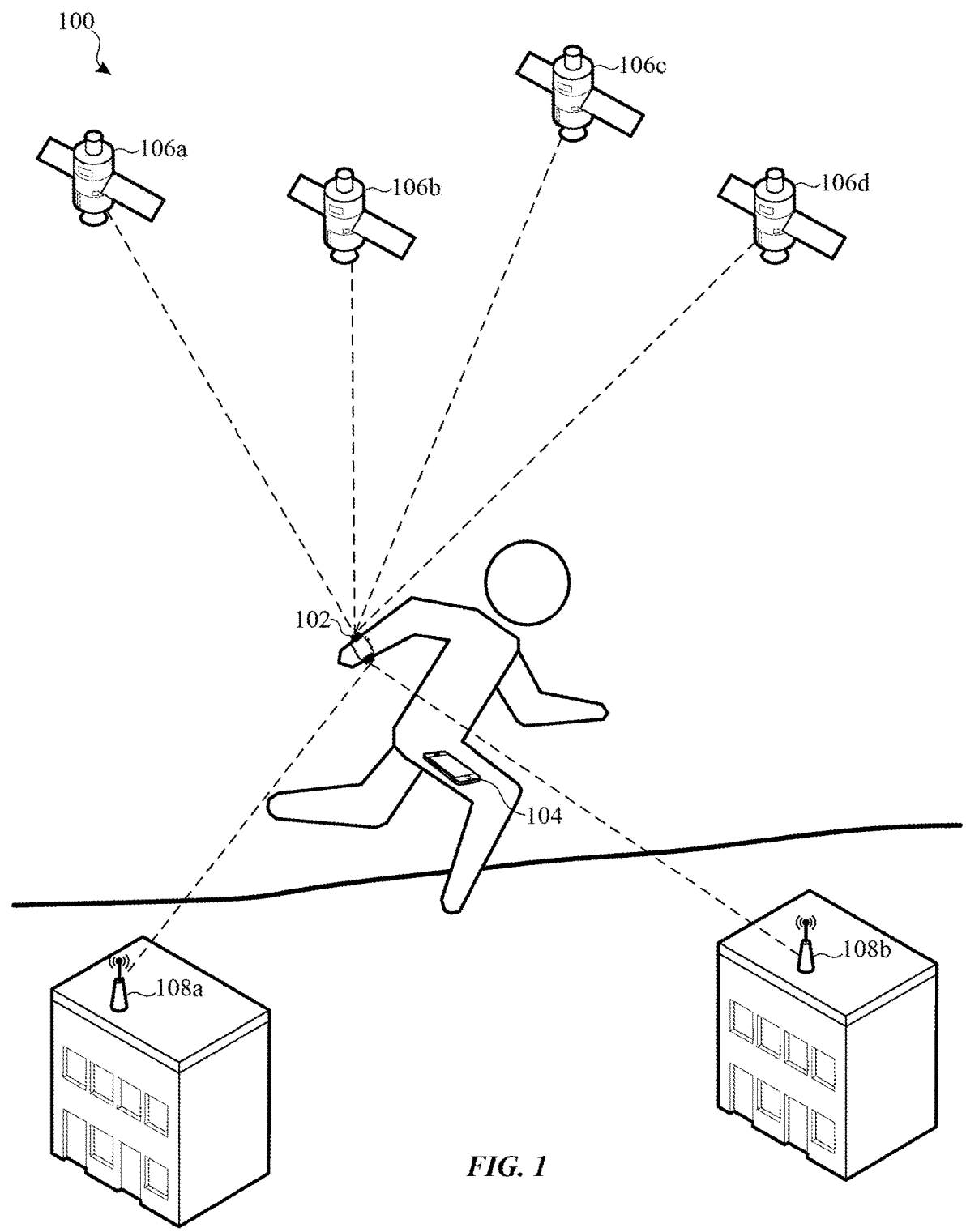
FIG. 1 illustrates an example environment in which one or more electronic devices may implement the subject system for estimating user location in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A location estimation system implemented by an electronic device provides an estimation of the location of the electronic device, e.g., as determined based on the motion of the electronic device. Thus, when the motion of the electronic device coincides with the motion of the user of the electronic device, the estimated location of the electronic device may be equivalent to the location of the user. However, in some cases, the motion of the electronic device may not coincide with the motion of the user. Thus, equating the estimated location of the device with the location of the user may lead to inaccurate results. For example, if the user is exercising, dancing or otherwise moving in place (e.g., with the device attached to the wrist of the user), the user's device may indicate horizontal travel (e.g., due to horizontal movement of the user's arm) although the user stayed in place. In another example, if the user is jogging, the device may erroneously indicate elevation gain based on the fact that the user's arm is moving up and down.

The subject system provides for estimating the location of a user of an electronic device, by providing separate estimates of user state (e.g., velocity and/or position) and device state (e.g., velocity, position and/or attitude) and applying a constraint between the user and device states. The subject system obtains signals corresponding to location data (e.g., via a GNSS receiver and/or wireless access points), and employs an inertial navigation system (INS) which uses device sensors, such as an accelerometer, and/or assumptions about the relationship between device motion and user motion to provide separate estimates of the user state and the device state. The separate estimates of the user state and the device state may be used to supplement the estimated location of the user as determined from the signals (e.g., GNSS signals) corresponding to location data.

Moreover, in determining the estimates of the user state and the device state, the subject system applies the aforementioned constraint, for example, to the estimated position of the device and the estimated position of the user, to require that the estimated positions be within a predefined distance of each other (e.g., 1 meter). By relating the estimated device and user states based on the distance-based constraint and/or the like, it is possible to achieve a more accurate estimate of the location of the user, since the user may typically be within the predefined distance of their device when using the device for location estimation. Furthermore, by determining separate estimates of the device and user states, estimator tension, which may be present when user and device position information disagree with each other, may be eliminated or reduced.

FIG. 1 illustrates an example environment 100 in which one or more electronic devices may implement the subject system for estimating user location in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The environment 100 includes electronic devices 102 and 104 (hereinafter "the electronic devices 102-104"), GNSS satellites 106a, 106b, 106c and 106d (hereinafter "the GNSS satellites 106a-106d") and wireless access points 108a-108b (e.g., Wi-Fi access points, cell towers, Bluetooth beacons and/or the like). For explanatory purposes, the environment 100 is illustrated in FIG. 1 as including the two electronics devices 102-104, the four GNSS satellites 106a-106d, and the two wireless access points 108a-108b; however, the environment 100 may include any number of electronic devices, any number of GNSS satellites, and any number of wireless access points.

One or more of the electronic devices 102-104 may be, for example, a portable computing device such as a laptop computer, a smartphone, a peripheral device (e.g., a digital camera, headphones), a tablet device, a wearable device such as a smartwatch, a band, and the like, or any other appropriate device that includes, for example, one or more wireless interfaces, such as GNSS radios, WLAN radios, cellular radios, Bluetooth radios, Zigbee radios, near field communication (NFC) radios, and/or other wireless radios. In FIG. 1, by way of example, the electronic device 102 is depicted as a smartwatch, and the electronic device 104 is depicted as a smartphone. Each of the electronic devices 102-104 may be, and/or may include all or part of, the electronic device discussed below with respect to FIG. 2, and/or the electronic system discussed below with respect to FIG. 5.

The environment 100 may facilitate estimating the position of user of the electronic devices 102-104. In one or more implementations, the electronic devices 102-104 are carried by or otherwise coupled to the user. In the example of FIG. 1, the electronic device 102 is strapped to a wrist of the user, and the electronic device 104 is secured (e.g., via pocket or strap) to a leg of the user. However, one or more of the electronic devices 102-104 may be coupled to and/or contained within a vehicle.

In the example of FIG. 1, the user is traveling by foot (e.g., jogging). However, the user may be traveling within a vehicle (e.g., a land vehicle such as an automobile, a motorcycle, a bicycle, or a watercraft or an aircraft vehicle), through water (e.g., swimming), or by other means. Alternatively or in addition, the user may not be traveling in a particular direction (e.g., exercising or stretching in place, sitting in a car, riding a stationary bicycle, running on a treadmill, treading water, etc.).

The environment 100 allows for one or more of the electronic devices 102-104 to determine their respective locations based on signals received from GNSS satellites 106a-106d. For example, the environment 100 allows the electronic devices 102-104 to determine their respective locations (e.g., longitude, latitude, and altitude/elevation) using signals transmitted along a line of sight by radio from the GNSS satellites 106a-106d. Alternatively or in addition, the environment 100 allows the electronic devices 102-104 to determine their respective locations based on time of arrival, angle of arrival, and/or signal strength of signals received from the wireless access points 108a-108b, which may have known locations (e.g., within a building or store, mounted on street posts, etc.).

Other positioning technologies may be used independent of or in conjunction with GNSS (e.g., the GNSS satellites 106a-106d) and wireless access point technology (e.g., and the wireless access points 108a-108b) to determine respective location. Examples of such positioning technologies include, but are not limited to, cellular phone signal positioning, Bluetooth signal positioning and/or image recognition positioning. Moreover, one or more of the electronic devices 102-104 may implement an inertial navigation system (INS) which uses device sensor(s) (e.g., motion sensors such as accelerometers, gyroscope) to calculate device state (e.g., device position, velocity, attitude) and/or user state (e.g., user velocity, position) for supplementing location data provided by the above-mentioned positioning technologies.

Figure 2:
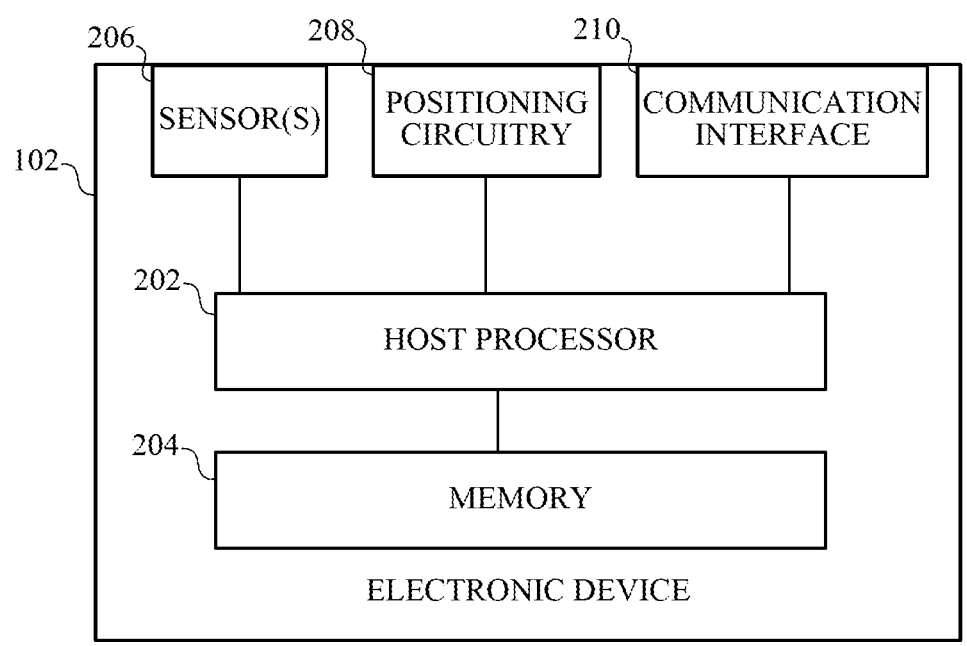
FIG. 2 illustrates an example electronic device that may implement the subject system for estimating user location in accordance with one or more implementations.

FIG. 2 illustrates an example electronic device that may implement the subject system for estimating user location in accordance with one or more implementations. For explanatory purposes, FIG. 2 is primarily described herein with reference to the electronic device 102 of FIG. 1, but may also apply to the electronic device 104 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a host processor 202, a memory 204, one or more sensor(s) 206, positioning circuitry 208 and a communication interface 210. The host processor 202 may include suitable logic, circuitry, and/or code that enable processing data and/or controlling operations of the electronic device 102. In this regard, the host processor 202 may be enabled to provide control signals to various other components of the electronic device 102. The host processor 202 may also control transfers of data between various portions of the electronic device 102. The host processor 202 may further implement an operating system or may otherwise execute code to manage operations of the electronic device 102. In addition, the host processor 202 may implement a software architecture for a location estimator that is discussed further below with respect to FIG. 3.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage. In one or more implementations, the memory 204 may store values for sensor signal measurements, GNSS receiver data, constraint data, device state estimates, device location estimates, user state estimates, and/or user location estimates, for example, based on motion of the electronic device 102.

The sensor(s) 206 may include one or more motion sensor(s), such as an accelerometer and/or a rate gyroscope. The motion sensor(s) may be used to facilitate movement and orientation related functions of the electronic device 102, for example, to detect movement, direction, and orientation of the electronic device 102.

Alternatively or in addition, sensor(s) 206 may include one or more of a barometer, an electronic magnetometer, an image sensor, or generally any sensor that may be used to facilitate a positioning system. The barometer may be utilized to detect atmospheric pressure, for use in determining altitude change of the electronic device 102. The electronic magnetometer (e.g., an integrated circuit chip) may provide data used to determine the direction of magnetic North, for example to be used as an electronic compass. The image sensor (e.g., a camera) may be used to capture single images to derive position and/or sequences of images to derive device motion. The captured single images and/or sequences of images may also be used to derive a pose (e.g., an orientation) of the image sensor (e.g., the camera).

The positioning circuitry 208 may be used in determining the location of the electronic device 102 based on positioning technology. For example, the positioning circuitry 208 may provide for one or more of GNSS positioning (e.g., via a GNSS receiver configured to receive signals from the GNSS satellites 106a-106d), wireless access point positioning (e.g., via a wireless network receiver configured to receive signals from the wireless access points 108a-108b), cellular phone signal positioning, Bluetooth signal positioning (e.g., via a Bluetooth receiver), image recognition positioning (e.g., via an image sensor), and/or an INS (e.g., via motion sensors such as an accelerometer and/or gyroscope).

The communication interface 210 may include suitable logic, circuitry, and/or code that enables wired or wireless communication, such as between the electronic devices 102-104. The communication interface 210 may include, for example, one or more of a Bluetooth communication interface, an NFC interface, a Zigbee communication interface, a WLAN communication interface, a USB communication interface, or generally any communication interface.

In one or more implementations, one or more of the host processor 202, the memory 204, the sensor(s) 206, the positioning circuitry 208, the communication interface 210, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
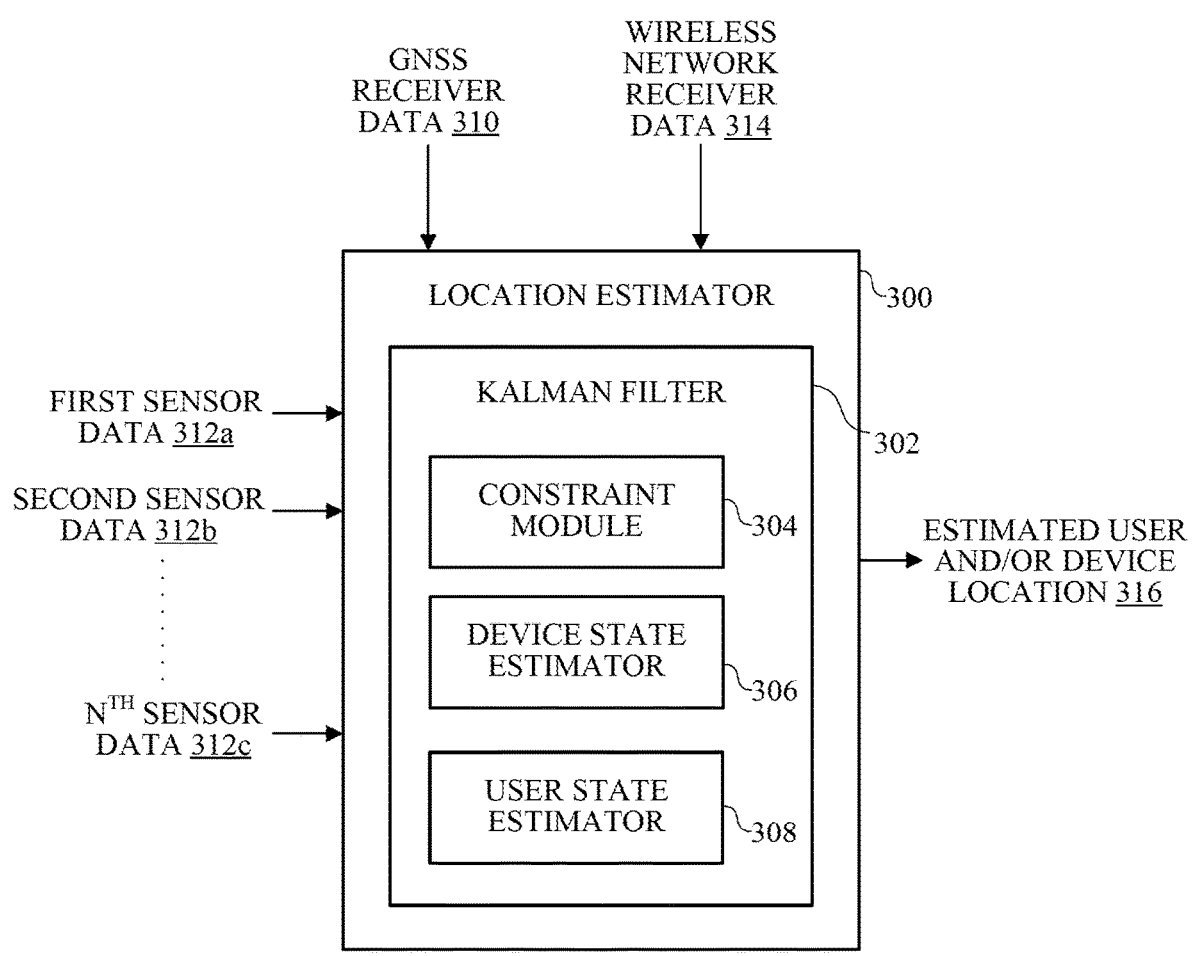
FIG. 3 illustrates an example of a location estimator of the subject system that may be implemented by an electronic device in accordance with one or more implementations.

FIG. 3 illustrates an example of a location estimator of the subject system that may be implemented by an electronic device in accordance with one or more implementations. For example, the location estimator 300 can be implemented by one or more software modules running on the host processor of any of the electronic devices 102-104. In another example, the location estimator 300 can be implemented by custom hardware (e.g., one or more coprocessors) configured to execute the functionality of the location estimator 300. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The location estimator 300 may include a Kalman filter 302, and the Kalman filter 302 may include a constraint module 304, a device state estimator 306 and a user state estimator 308. The location estimator 300 may receive sensor data (e.g., the first sensor data 312a, the second sensor data 312b, . . . , and the $N^{th}$ sensor data 312c, hereinafter "the sensor data 312a-312c"), GNSS receiver data 310 and/or wireless network receiver data 314 as input, and may provide an estimated user and/or device location 316 as output. In one or more implementations, the sensor data 312a-312c may be received from the sensor(s) 206, the GNSS receiver data 310 may be received from a GNSS receiver (e.g., corresponding to the positioning circuitry 208), and/or and or the wireless network receiver data 314 may be received from a wireless network receiver (e.g., corresponding to the positioning circuitry 208).

In one or more implementations, the location estimator 300 may be configured to combine radionavigation signals (e.g., the GNSS receiver data 310 and/or the wireless network receiver data 314 received by the position circuitry 208) with additional sensor data (e.g., the sensor data 312a-312c received by the sensor(s) 206). For example, the sensor data 312a-312c may include accelerometer measurements corresponding to acceleration of the electronic device 102, and/or gyroscope measurements corresponding to rotation rates of the electronic device 102.

The sensor data 312a-312c may be used to improve the position solution by subtracting out antenna motion (e.g., a GNSS antenna) between epochs of sampled radionavigation measurements (e.g., where an epoch corresponds a measurement interval of a GNSS receiver), effectively allowing multiple epochs of measurements to be statistically combined to reduce error. These techniques may be performed by an inertial navigation system (INS) implemented by the location estimator 300. Thus, the location estimator 300 may be used to produce an estimate of device position, velocity, and/or attitude. The location estimator 300 may further be used to produce an estimate of user position and/or velocity as discussed herein.

In this regard, the location estimator 300 may implement the Kalman filter 302. The Kalman filter 302 may correspond to an algorithm that uses a series of measurements/signals (e.g., which may contain noise and other inaccuracies) observed over time, and that produces estimates of unknown variables (e.g., device and/or user state) which tend to be more accurate than those based on a single measurement alone (e.g., single GNSS measurements).

Thus, to improve the availability and quality of position solutions, measurements of GNSS receiver signals (e.g., the GNSS receiver data 310) may be used in the Kalman filter 302 with numerical integration of sensor measurements (e.g., the sensor data 312a-312c) to subtract out the antenna motion between epochs. In one or more implementations, the INS implemented by the location estimator 300 performs such numerical integration. Thus, the location estimator 300 may subtract out antenna motion between epochs, so that multiple epochs of GNSS measurements may be combined without being impacted by errors introduced by the antenna motion.

As noted above, in some cases, the motion of the electronic device 102 may not coincide with the motion of the user. Thus, equating device position with the position of the user may lead to inaccurate results. For example, if the user is exercising or otherwise moving in place, the electronic device 102 (e.g., attached to the user's wrist) may indicate horizontal travel (e.g., corresponding to arm swing) although the user stayed in place. In another example, if the user is jogging, the electronic device 102 may erroneously indicate elevation gain based on the fact that the user's arm is moving up and down. In another example, the user may be interested in his/her own speed while walking, not the speed of the electronic device 102 attached to his/her hand. In yet another example, if a user is driving and a passenger picks up the electronic device 102, the electronic device 102 may erroneously indicate that the car has turned.

Thus, with respect to motion, the Kalman filter 302 may treat the electronic device 102 and the user as two separate entities, and provide separate estimates for device state and user state. The Kalman filter 302 therefore includes both a device state estimator 306 for estimating a state of the electronic device 102, and a user state estimator 308 for estimating a state of the user. Moreover, the Kalman filter 302 includes a constraint module 304, which implements a constraint that assumes distance between the electronic device 102 and the user is within a predefined distance when estimating the device and user states.

In one or more implementations, the constraints may vary based on available information. For example, for a handheld device such as the electronic device 104, a distance constraint may be set for 1 m between the user (e.g., the user's center of mass) and the electronic device 104 (e.g., as held in the user's hand).

However, if the user places the electronic device 104 in a mount rigidly fixed to their vehicle, there is effectively no difference between device position and the user (e.g., the vehicle) position, and the distance constraint may be reduced to zero. In this latter case, other constraints may be applied that may not apply in the handheld case (e.g., velocity of user and devices are also the same).

For example, in one or more implementations, the Kalman filter 302 may keep device and user velocities close to (but not necessarily equal to) each other when the device is determined to be rigidly mounted (e.g., in automotive positioning, where the device and user are often more or less rigidly attached to the vehicle). Device and user velocities may be similar in this case, and estimator performance may be improved by applying a measurement (e.g., via the Kalman filter 302) that pulls the device and user velocities toward each other. However, these two velocities may not necessarily be equal, as generally the user and device velocities may be affected differently during turns (e.g., vehicle turns) due to each of the user and the device having a slightly different radius of curvature. It is noted that such constraints may not be mutually exclusive with the distance-based constraints described herein.

The device state estimator 306, the user state estimator 308 and the constraint module 304 are depicted as separate components and/or modules within the Kalman filter 302, for example, to illustrate a logical partitioning of the respective device state(s), user state(s), and constraint(s) for representation purposes. However, the Kalman filter 302 may be configured to provide estimates of device state and/or user state based on constraint(s) as described herein, by using a different order, a different partitioning and/or a different configuration of one or more components and/or modules.

Moreover, although the location estimator 300 is illustrated as using a Kalman filter (e.g., element 302) for estimating device and user state(s), it is possible for the location estimator 300 to implement a different filter for estimating the device and user state(s). In this regard, the Kalman filter 302 is one example of a filter to blend together the information, measurements and assumptions described herein. Other Bayesian and non-Bayesian filters (e.g., or estimators) may be used in lieu of, or as a supplement to, the Kalman filter 302. For example, such filter(s) may correspond to a particle filter, a sigma point filter and/or any other type of filter configured to estimate device and user state(s) based on the constraint(s) as described herein.

The estimated state of the electronic device 102 may include one or more of device position, velocity and/or attitude. Other parameterizations may also be used. The device state estimator 306 may estimate these values based on device motion, for example, as indicated by radionavigation signals and/or motion sensor signals obtained by the sensor(s) 206 of the electronic device 102.

The estimated state of the user may include one or more of user position and/or user velocity. Other parameterizations may also be used. The user state estimator 308 may estimate these values based on some signals used in the device state estimation (e.g., GNSS signals), but may further incorporate signals that are specific to user motion and that are not used in the device state estimation.

In this regard, the user state estimator 308 may work in conjunction with device components (e.g., sensors) that provide information indicative of user motion. As noted above, the user may be participating in a physical activity (e.g., dancing in place, jogging, swimming, and the like) in which the motion of the device may not represent the actual motion of the user.

For example, the user state estimator 308 may use one or more of the following parameters, corresponding to user motion, in estimating user position and/or velocity: pedometer information, altitude/elevation assistance information, zero motion information, physical activity variables (e.g., flags) indicating whether the participating in a particular activity (e.g., cycling, swimming, driving or traveling within a vehicle, running, etc.), physical state variables indicating whether the user is generally associated with a particular physical state (e.g., a handicap state indicating or suggesting wheelchair use, and/or an injury or physical condition which limits particular movement), other physical state variables indicating a temporary/current physical state (e.g., heart rate may suggest either an active or resting physical state), and/or any other data indicative of user motion.

The constraint module 304 of the Kalman filter 302 relates the estimates provided by the device state estimator 306 (e.g., device velocity, position and/or attitude) to the estimates provided by the user state estimator 308 (e.g., user velocity and/or position), based on a requirement that the electronic device 102 and the user are within a predefined distance of each other (e.g., no more than ~1 meter, corresponding a user's arm length). In other words, the respective estimates of device state and user state are constrained by the predefined distance.

In addition or an alternative to distance-based constraints, the constraint module 304 may implement velocity-based constraint(s). For example, the Kalman filter 302 may relate the estimates provided by the device state estimator 306 (e.g., device velocity, position and/or attitude) to the estimates provided by the user state estimator 308 (e.g., user velocity and/or position), based on a difference in velocity (e.g., a maximum difference in velocity) between the electronic device 102 and the user. For example, velocity-based constraint(s) may apply based on whether or not the user is moving and/or how quickly the electronic device 102 may/ should move with respect to the user.

As noted above, the constraint module 304 (e.g., corresponding to the position and/or velocity constraint(s)) is illustrated as separate from the device state estimator 306 (e.g., corresponding to the device state estimate(s)) and the user state estimator 308 (e.g., corresponding to user state estimate(s)), for logical partitioning and/or representation purposes. However, in one or more implementations, the constraint(s) as described herein may effectively be built in between the device state estimate(s) and the user state estimate(s) by the Kalman filter 302, for example, such that the constraint module 304, device state estimator 306 and/or the user state estimator 308 are not implemented as separate modules/components.

In one example of a constraint, if the user is moving (e.g., exercising, dancing) in place, the device state estimator 306 may typically estimate device travel in a particular direction (e.g., horizontal and/or vertical travel), based on the radio-navigation signals and/or motion sensor signals obtained by the sensor(s) 206 of the electronic device 102. On the other hand, the user state estimator 308 may indicate little or no travel in a particular direction, e.g., based on a device pedometer indicating zero steps, and/or a heart rate monitor indicating a low heart rate (e.g., thereby suggesting the user is resting, and not in an active state such as running). Thus, the constraint module 304 may relate the estimates provided by the device state estimator 306 and the estimates provided by the user state estimator 308, based on the requirement/ assumption that the user and device are within the predefined distance (e.g., 1 meter) of each other.

In another example, if the user is jogging, the device state estimator 306 may detect elevation gain (e.g., via sensor(s) 206 such as a barometer) based on the up and down arm movement in a case where the electronic device 102 is attached or coupled to the user's arm. On the other hand, the user state estimator 308 may indicate little or no user elevation while jogging, for example, based on a digital elevation model (e.g., indicating predefined elevations for particular geographies) implemented by the electronic device 102. Thus, the constraint module 304 may implement the constraint (e.g., no more than 1 meter separating the device and user) such that elevation gain estimated by the device state estimator 306 (e.g., via a barometer) is appropriately reconciled with elevation estimated by the user state estimator 308.

In another example, if the user is traveling within a car (e.g., driving), the device state estimator 306 may estimate device state based on the radionavigation signals and/or motion sensor signals obtained by the sensor(s) 206 of the electronic device 102. In a case where the user or a passenger in the vehicle picks up and/or otherwise moves the electronic device 102, the motion sensor signals may estimate that the vehicle has changed course. On the other hand, the user state estimator 308 may determine that the user is traveling in a known direction along a known road (e.g., based on known road networks provided by map data), and therefore estimate that the vehicle has not changed course. Thus, the constraint module 304 may relate the estimates provided by the device state estimator 306 and the estimates provided by the user state estimator 308 based on the requirement that the user and device are within the predefined distance (e.g., 1 meter) of each other.

Thus, the above-described scenarios of the user moving in place, jogging/walking and/or the user driving correspond to examples where physical activity by the user results in device motion not coinciding with user motion. Other examples of physical activity such as, but not limited to, treading water (e.g., where the user does not travel), travel by swimming, wheelchair travel by manually rotating the wheels (e.g., where the user is wearing a smartwatch), may apply. In addition, travel by different types of vehicles (e.g., via train, aircraft, watercraft) may apply. In any of these examples, the constraint module 304 may implement a distance threshold so as to relate the estimates provided by the device state estimator 306 with those provided by the user state estimator 308 (e.g., based on the user swimming, treading water, being in a particular type of vehicle, and the like).

In some scenarios, device motion may coincide with user motion. For example, in a case where the user is traveling in a vehicle and the electronic device 102 is fixedly mounted within the vehicle, the device motion coincides with the user motion. As such, an estimate of device state (e.g., velocity, position and/or attitude) may be the same as, or within a reasonable tolerance of, the user state. Thus, in one or more implementations, the Kalman filter 302 may be configured to determine, and/or receive, context data of the user and/or device, and apply appropriate parameters/values for the user state estimator 308 and/or the constraint module 304, based on the assumption that the device motion coincides with user motion.

In one or more implementations, the context data may be based on a user profile associated with the electronic device 102. For example, the user profile may indicate that the user is a wheel chair user. Alternatively or in addition, the context may be based on information provided by applications on the device. For example, map-based applications may indicate user geography, travel applications may indicate whether the user is traveling by vehicle (e.g., train, bus), activity-based applications may indicate whether the user is participating in a particular activity (e.g., checking into a yoga class or starting a workout on a fitness tracker app). This contextual data may be used by the Kalman filter 302 of the location estimator 300 in order to set appropriate parameters (e.g., flags) for estimating device and/or user state.

As noted above, the Kalman filter 302 may use a series of measurements/signals (e.g., the GNSS receiver data 310, the wireless network receiver data 314, and/or the sensor data 312a-312c) observed over time (e.g., a per epoch basis), to produce estimates of unknown variables (e.g., device state and/or user state). In one or more implementations, the Kalman filter 302 may determine the parameters/values for the device state estimator 306, the user state estimator 308 and the constraint module 304, so as to determine the estimated user location and/or device location 316. As noted above, determination of these parameter/values may be based on context data (e.g., related to the user and/or device).

With respect to the device state estimator 306, the user state estimator 308 and the constraint module 304, the Kalman filter 302 may facilitate in separately estimating the device position (e.g., in Earth-fixed XYZ space), the device velocity (e.g., in XYZ space), the device attitude (e.g., orientation with respect to an Earth-fixed frame), the user position (e.g., in Earth-fixed XYZ space), and the user velocity (e.g., in Earth-fixed XYZ space). As noted above, radionavigation measurements and/or motion sensor measurements may apply to device states (e.g., per the device state estimator 306). In addition, other sources of information such as user activity, pedometer-based information and/or digital elevation model information may apply to the user state (e.g., per the user state estimator 308). In one or more implementations, the device states and the user state may related as follows:

$$\|\text{device position } (XYZ) - \text{user position } (XYZ)\| = w$$

where w is zero mean, white, Gaussian noise with standard deviation of the predefined distance (e.g., 1 meter).

Thus, the location estimator 300 provides for separating and blending information that applies to the device motion (radionavigation signals, inertial sensors, and the like) with information that applies to user motion (e.g., pedometer speed, altitude assistance, zero motion, context data), in order to more accurately determine user location.

Moreover, user position and/or velocity estimates may be presented to the user for tracking purposes (turn-by-turn directions, fitness metrics and the like). The estimates may be provided as visual output and/or audio output by the electronic device 102. On the other hand, device position, velocity and/or attitude estimates may be separately maintained to facilitate user state estimation as described herein, and/or for underlying features (in-place exercise, augmented reality, etc.).

In one or more implementations, each of the electronic devices 102-104 may implement respective location estimators 300, and the respective estimated states of the user and device may be communicated between the electronic devices 102-104 (e.g., via the communication interface 210). In the example of FIG. 1, the user has the electronic device 102 attached to his/her wrist and the electronic device 104 attached or otherwise coupled to his/her leg (e.g., via a pocket). Each of the electronic devices 102-104 may estimate device state and user state via their respective device state estimators 306 and user state estimators 308. The estimated device and/or user states may be communicated between the electronic devices 102-104, and the user location may be determined based on the estimated states provided by both of the electronic devices 102-104.

In one or more implementations, calculating the user location based on the estimated states from two (or more) devices is based on a centralized architecture in which one device (e.g., the electronic device 104) is designated as the primary device. The primary device receives estimates from other device(s) (e.g., the electronic device 102) and calculates the user location, which is in turn provided to the user. For example, the primary device may calculate the user location based on averaging the estimated states from the multiple devices, taking a centroid of the estimated states, or other techniques (e.g., including the use of weighted values based on the respective device, and/or based on the positions of the devices with respect to each other and/or the user). Alternatively or in addition, calculating the user location based on the estimated states from the multiple devices may be based on a decentralized architecture, in which each device (e.g., each of the electronic devices 102-104) separately determines user location based on its respective local estimates and the estimates received from the other devices (e.g., based on averaging, determining a centroid, or the like).

In one or more implementations, one or more of the location estimator 300, including the Kalman filter 302, the constraint module 304, the device state estimator 306 and/or the user state estimator 308, are implemented as software instructions, stored in the memory 204, which when executed by the host processor 202, cause the host processor 202 to perform particular function(s).

In one or more implementations, one or more of the Kalman filter 302, the constraint module 304, the device state estimator 306 and the user state estimator 308, may be implemented in software (e.g., subroutines and code), hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 4:
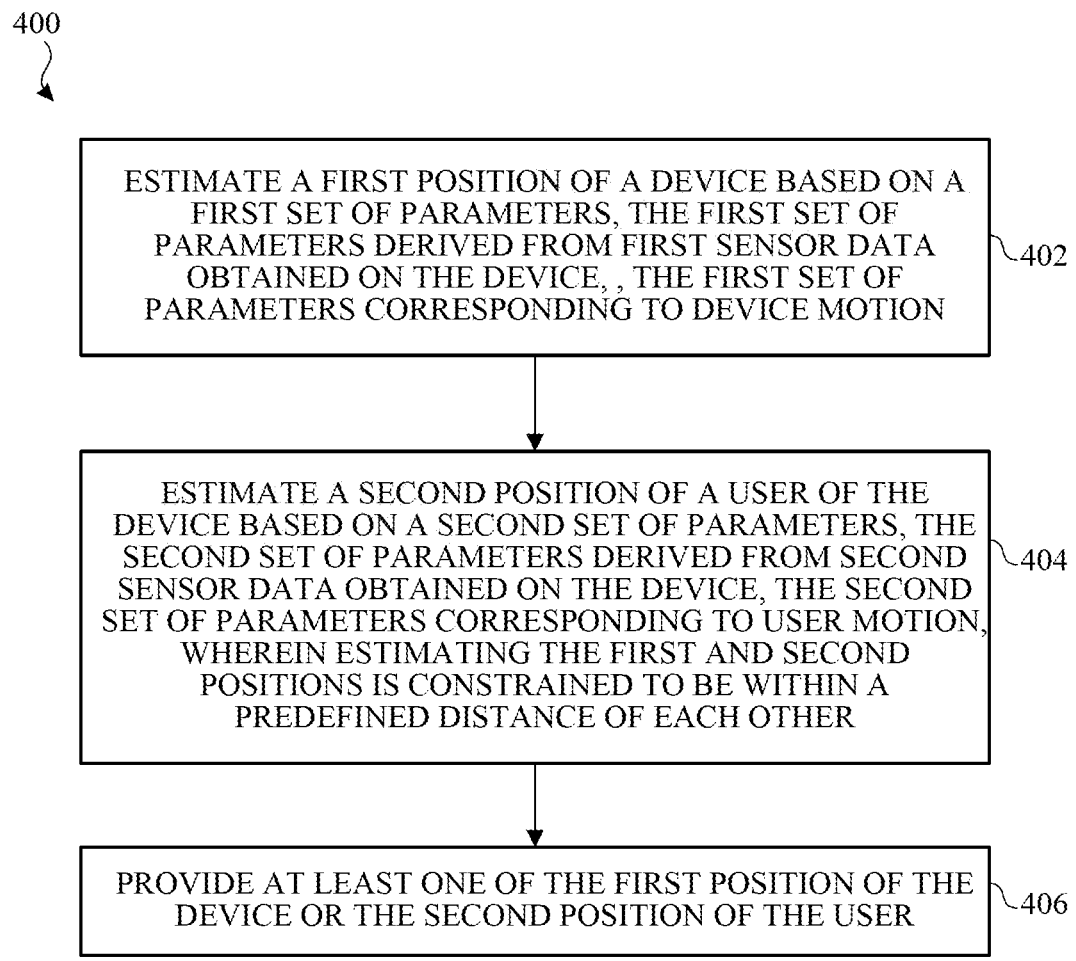
FIG. 4 illustrates a flow diagram of an example process for estimating user location in accordance with one or more implementations.

FIG. 4 illustrates a flow diagram of an example process for estimating user location in accordance with one or more implementations. For explanatory purposes, the process 400 is primarily described herein with reference to the electronic device 102 of FIG. 1. However, the process 400 is not limited to the electronic device 102 and for example, may apply to the electronic device 104. Moreover, one or more blocks (or operations) of the process 400 may be performed by one or more other components of the electronic device 102, and/or by other suitable devices. Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

The electronic device 102 estimates its position based on a first set of parameters, the first set of parameters being derived from first sensor data obtained on the device, and the first set of parameters corresponding to device motion (402). For example, the first set of parameters may include at least one of radionavigation signals or motion sensor signals obtained by the electronic device 102.

The electronic device 102 estimates a second position of a user of the electronic device 102 based on a second set of parameters, the second set of parameters being derived from second sensor data obtained on the device, and the second set of parameters corresponding to user motion (404). The first and second positions may be estimated using an inertial navigation system, where the inertial navigation system supplements location estimates provided by at least one of Global Navigation Satellite System positioning or wireless access point positioning associated with the device.

For example, the second set of parameters may correspond to at least one of pedometer information, altitude assistance information or zero motion information corresponding to the user. The second set of parameters may correspond to a physical activity being performed by the user. Alternatively or in addition, the second set of parameters may correspond to a physical state of the user.

Estimating the first and second positions is constrained to be within a predefined distance of each other. The first position of the device and the second position of the user may be estimated using a Kalman filter which implements a constraint corresponding to the predefined distance. The electronic device 102 provides at least one of the first position of the device or the second position of the user (406).

Estimating the first position and estimating the second position may further be performed with respect to a second device of the user. User position may be estimated based on a combination of the respective first and second positions as estimated by the device and the second device. For example, the electronic device 102 may receive the first position and second position as estimated by the second device, estimate the user position based on the combination of the respective first and second positions as estimated by the device and the second device, and provide the user position.

As described above, one aspect of the present technology is the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, social networking information, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information, or publicly available information.

Figure 5:
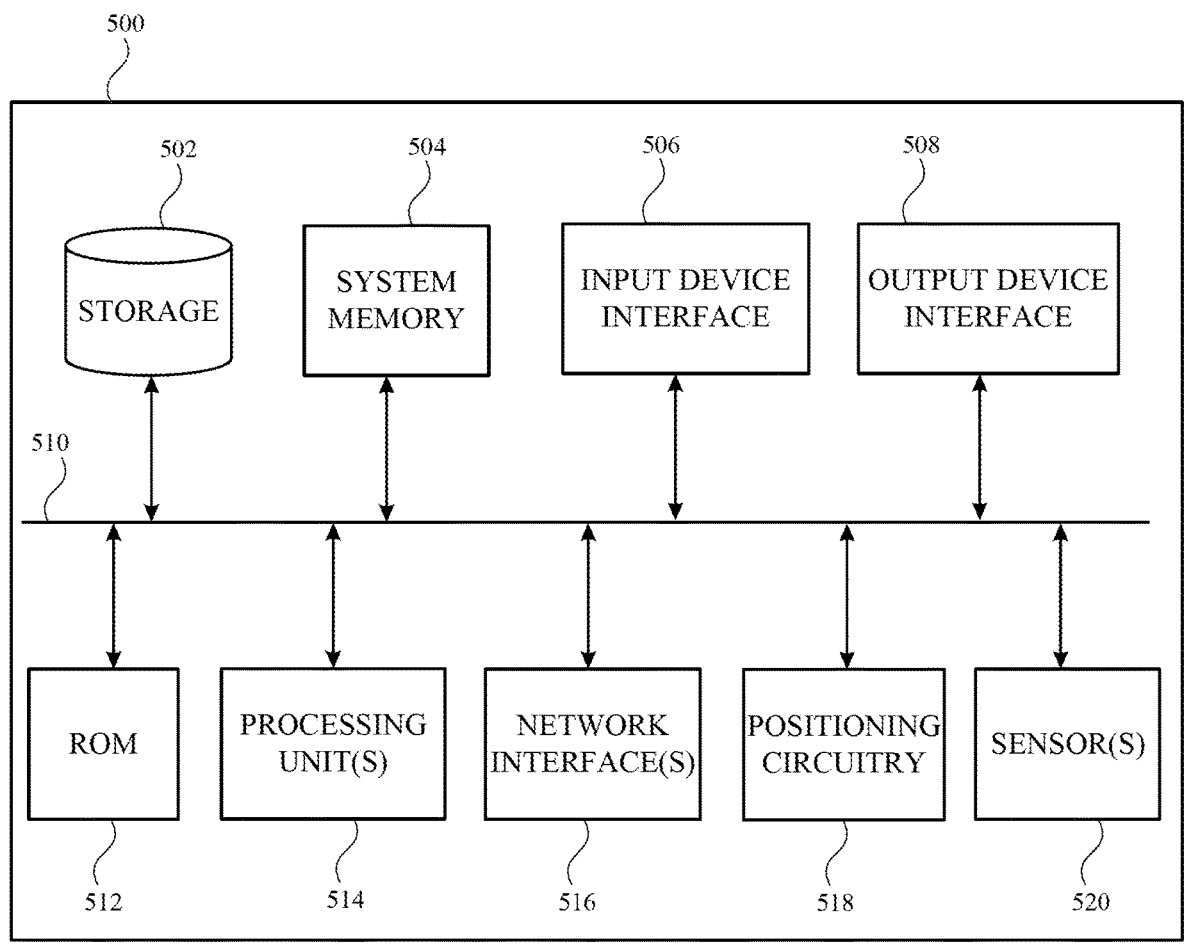
FIG. 5 illustrates an example electronic system with which aspects of the subject technology may be implemented in accordance with one or more implementations.

FIG. 5 illustrates an electronic system 500 with which one or more implementations of the subject technology may be implemented. The electronic system 500 can be, and/or can be a part of, any electronic device for generating the features and processes described in reference to FIGS. 1-4, including but not limited to a laptop computer, tablet computer, smartphone, and wearable device (e.g., smartwatch, fitness band). The electronic system 500 may include various types of computer readable media and interfaces for various other types of computer readable media. The electronic system 500 includes one or more processing unit(s) 514, a permanent storage device 502, a system memory 504 (and/or buffer), an input device interface 506, an output device interface 508, a bus 510, a ROM 512, one or more processing unit(s) 514, one or more network interface(s) 516, positioning circuitry 518, sensor(s) 520, and/or subsets and variations thereof.

The bus 510 collectively represents all system, peripheral, and chipset buses that communicatively connect the numerous internal devices of the electronic system 500. In one or more implementations, the bus 510 communicatively connects the one or more processing unit(s) 514 with the ROM 512, the system memory 504, and the permanent storage device 502. From these various memory units, the one or more processing unit(s) 514 retrieves instructions to execute and data to process in order to execute the processes of the subject disclosure. The one or more processing unit(s) 514 can be a single processor or a multi-core processor in different implementations.

The ROM 512 stores static data and instructions that are needed by the one or more processing unit(s) 514 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 514 may need at runtime. In one or more implementations, the processes of the subject disclosure are stored in the system memory 504, the permanent storage device 502, and/or the ROM 512. From these various memory units, the one or more processing unit(s) 514 retrieves instructions to execute and data to process in order to execute the processes of one or more implementations.

The bus 510 also connects to the input and output device interfaces 506 and 508. The input device interface 506 enables a user to communicate information and select commands to the electronic system 500. Input devices that may be used with the input device interface 506 may include, for example, alphanumeric keyboards and pointing devices (also called "cursor control devices"). The output device interface 508 may enable, for example, the display of images generated by electronic system 500. Output devices that may be used with the output device interface 508 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

The bus 510 also connects to positioning circuitry 518 and sensor(s) 520. The positioning circuitry 518 may be used in determining device location based on positioning technology. For example, the positioning circuitry 518 may provide for one or more of GNSS positioning, wireless access point positioning, cellular phone signal positioning, Bluetooth signal positioning, image recognition positioning, and/or an INS (e.g., via motion sensors such as an accelerometer and/or gyroscope).

In one or more implementations, the sensor(s) 520 may be utilized to detect movement, travel and orientation of the electronic system 500. For example, the sensor(s) may include an accelerometer, a rate gyroscope, and/or other motion-based sensor(s). Alternatively or in addition, the sensor(s) 520 may include one or more audio sensors(s) and/or image-based sensor(s) for determining device position. In another example, the sensor(s) 520 may include a barometer which may be utilized to detect atmospheric pressure (e.g., corresponding to device altitude).

Finally, as shown in FIG. 5, the bus 510 also couples the electronic system 500 to one or more networks and/or to one or more network nodes through the one or more network interface(s) 516. In this manner, the electronic system 500 can be a part of a network of computers (such as a LAN, a wide area network ("WAN"), or an Intranet, or a network of networks, such as the Internet. Any or all components of the electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   estimating a first position of a device based on a first set of parameters, the first set of parameters derived from first sensor data obtained on the device, the first set of parameters corresponding to device motion; and
   estimating a second position of a user of the device based on a second set of parameters, the second set of parameters derived from second sensor data obtained on the device, the second set of parameters corresponding to user motion,
   wherein estimating the first and second positions comprises constraining both the estimating of the first position and the estimating of the second position using a predefined relationship between the device motion and the user motion; and
   providing at least one of the first position of the device or the second position of the user.

2. The method of claim 1, wherein the predefined relationship between the device and the user motion corresponds to the first and second positions being constrained to be within a predefined distance of each other.

3. The method of claim 2, wherein the first position of the device and the second position of the user are estimated using a Kalman filter which implements a constraint corresponding to the predefined distance.

4. The method of claim 1, wherein the second set of parameters includes a parameter derived from the second sensor data obtained on the device and a physical activity parameter that indicates a physical activity being performed by the user or to a physical state of the user, and wherein the method further comprises modifying the predefined relationship based on the physical activity parameter.

5. The method of claim 1, wherein the second set of parameters corresponds to at least one of pedometer information, altitude assistance information or zero motion information corresponding to the user.

6. The method of claim 1, wherein the first set of parameters corresponds to at least one of radionavigation signals or motion sensor signals obtained by the device.

7. The method of claim 1, wherein estimating the first position and estimating the second position are further performed with respect to a second device of the user, and
   wherein a user location is estimated based on a combination of the respective first and second positions as estimated by the device and the second device.

8. The method of claim 7, further comprising:
   receiving the first position and second positions as estimated by the second device;
   estimating the user location based on the combination of the respective first and second positions as estimated by the device and the second device; and
   providing the user location.

9. The method of claim 1, wherein the first and second positions are estimated using an inertial navigation system, the inertial navigation system supplementing location estimates provided by at least one of Global Navigation Satellite System positioning or a wireless access point positioning associated with the device.

10. A device, comprising: at least one processor; and
a memory including instructions that, when executed by the at least one processor, cause the at least one processor to:
estimate a first state of a device based on a first set of parameters, the first set of parameters derived from first sensor data obtained on the device, the first set of parameters corresponding to device motion; and
estimate a second state of a user of the device based on a second set of parameters, the second set of parameters derived from second sensor data obtained on the device, the second set of parameters corresponding to user motion,
wherein estimating the first and second states is based on a filter which implements a constraint on estimating both the first state and the second state that the device and the user be within a predefined distance of each other; and
providing at least one of the first state of the device or the second state of the user.

11. The device of claim 10, wherein the second set of parameters corresponds to a physical activity being performed by the user.

12. The device of claim 10, wherein the second set of parameters corresponds to a physical state of the user.

13. The device of claim 10, wherein the second set of parameters corresponds to user motion, and correspond to at least one of pedometer information, altitude assistance information or zero motion information corresponding to the user.

14. The device of claim 10, wherein the first set of parameters corresponds to at least one of radionavigation signals or motion sensor signals obtained by the device.

15. The device of claim 10, wherein estimating the first state and estimating the second state are further performed with respect to a second device of the user, and wherein a user location is estimated based on a combination of the respective first and second states as estimated by the device and the second device.

16. The device of claim 15, wherein the instructions further cause the at least one processor to:
receive the first state and second states as estimated by the second device;
estimate the user location based on the combination of the respective first and second states as estimated by the device and the second device; and
provide the user location.

17. The device of claim 10, wherein the first and second states are estimated using an inertial navigation system, the inertial navigation system supplementing location estimates provided by at least one of Global Navigation Satellite System positioning or a wireless access point positioning associated with the device.

18. The device of claim 10, wherein the first state comprises at least one of a position, velocity or attitude of the device.

19. The device of claim 10, wherein the second state comprises at least one of a position or velocity of the user.

20. A computer program product comprising code stored in a non-transitory computer-readable storage medium, the code comprising:
code to estimate a first state of a device based on a first set of parameters, the first set of parameters derived from first sensor data obtained on the device, the first set of parameters corresponding to device motion; and
code to estimate a second state of a user of the device based on a second set of parameters, the second set of parameters derived from second sensor data obtained on the device, the second set of parameters corresponding to user motion,
wherein estimating the first and second states comprises constraining both the estimate of the first state and the estimate of the second state using a predefined distance between the device and the user; and
code to provide at least one of the first state of the device or the second state of the user.

* * * * *